June 24, 1969  R. L. VICK  3,451,429
CONTROL VALVE PROVIDING MEANS FOR MINIMIZING SEAT WEAR
Filed Sept. 28, 1966
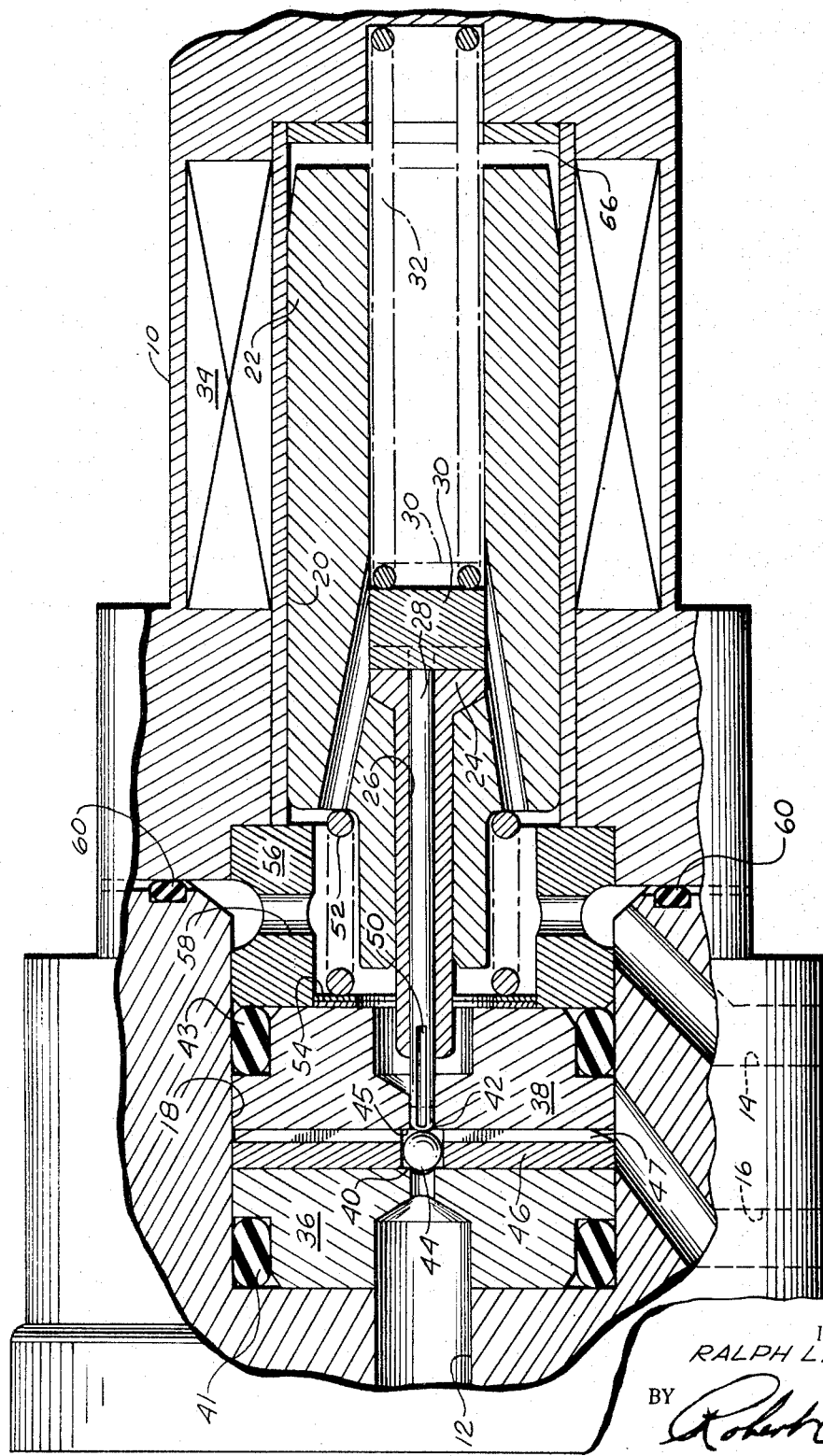
INVENTOR.
RALPH L. VICK
BY
ATTORNEY United States Patent Office 3,451,429
Patented June 24, 1969

3,451,429
CONTROL VALVE PROVIDING MEANS FOR
MINIMIZING SEAT WEAR
Ralph L. Vick, Granada Hills, Calif., assignor to The
Bendix Corporation, a corporation of Delaware
Filed Sept. 28, 1966, Ser. No. 582,621
Int. Cl. F16k 31/05; F17d 1/10
U.S. Cl. 137—625.65         2 Claims

ABSTRACT OF THE DISCLOSURE

A solenoid-actuated control valve is shown having inlet, control and return ports with a ball valve movable between a pair of seats to control flow between the inlet and control ports and between the control and return ports. The armature includes a soft iron piston having an axial passage therethrough with a hardened insert over part of its length and a contact pin carried in the insert. A strong spring urges the piston and contact pin toward the ball valve member to close the inlet port, and a weaker spring urges the piston in the opposite direction such that, when the solenoid is energized, its force plus the force of the weaker spring and the fluid pressure at the inlet act to overcome the strong spring and cause the ball valve to be seated on the seat between the control and return ports. Upon de-energization of the solenoid, the force of the strong spring moves the piston and the contact pin in a direction to force the ball valve against its seat at the inlet port, at which time the contact pin stops and the greater mass of the piston continues moving until its momentum is absorbed, largely by the weaker spring, thereby avoiding the deterioration which would result if the momentum of the piston were to be dissipated over the small area of the valve seat.

---

This invention relates to control valves, and more particularly to a construction for a three-way control valve in which a substantial mass is moved during operation of the valve.

Pilot valves or control valves may be actuated hydraulically or mechanically, or electrically as in the case of a solenoid-actuated valve. In such valves, particularly solenoid valves having armatures of significant weight, it frequently happens that the total kinetic energy resulting from the mass and velocity of the moving parts during actuation results in extremely high loading forces per unit area being applied to the valve and the valve seat. These high unit forces result in rapid deterioration of the valve and the valve seat, requiring frequent repair and replacement of parts. It is, therefore, the primary object of the present invention to provide a construction for a three-way pilot valve in which energy absorption by the seat and valve member is minimized through a substantial reduction in the mass of moving parts which impact on the seat.

It is another object of the present invention to provide a construction for a three-way solenoid-actuated valve in which energy absorption by the seat and valve member is minimized by permitting the major part of the kinetic energy of the moving armature structure to be expended against structure other than the seat.

Other objects and advantages will become apparent from consideration of the following specification taken in connection with the accompanying drawing, in which the single figure is a sectional view of a valve mechanism incorporating my invention.

Referring now to the figure, the valve mechanism consists of a body shown generally at numeral 10 having an inlet port 12 communicating with a source of fluid under pressure, a return port 14 communicating with a return line to the fluid pressure source, and a control port 16 which communicates with a device to be controlled, such as a hydraulic motor (not shown). The body 10 includes a hollow interior chamber 18, part of which constitutes a cylindrical bore 20. Positioned within bore 20 is an armature structure consisting of a soft iron piston 22 having a hollow interior wherein is located a guide member 24 of relatively hard material, said guide member having a small diameter axial passageway 26. Slidable within passageway 26 is an elongated pin member 28. Abutting against one end of pin 28 is a larger diameter cylindrical member 30 against which the force provided by a spring 32 is exerted. The opposite end of spring 32 abuts against a wall at one end of the cylindrical bore 20. Also positioned within housing 10 in such manner as to generate magnetic lines of force crossing the piston 22 is an electrical winding or coil 34.

Valve seat members 36 and 38 are retained within housing 10, and these members include valve seat surfaces 40 and 42, respectively. An O-ring seal 41 compressed between the housing 10 and seat member 36 prevents leakage between inlet passage 12 and control passage 16, and a similar O-ring seal 43 compressed between seat member 38 and housing 10 prevents leakage between control passage 16 and return passage 14. A ball valve member 44 is so located in a chamber 45 as to be movable between seats 40 and 42 and has a substantial area exposed to the fluid pressure present in inlet passageway 12. A disk-shaped member 46 positioned between seat members 36 and 38 includes a plurality of radial slots 47 which communicate the small chamber 45 with control pressure passage 16. The pin 28 is longitudinally grooved or fluted over a portion of its length to facilitate flow between passages 16 and 14, the grooves appearing as shown at numeral 50. Positioned between the piston member 22 and seat member 38 is a spring 52, the loading force of which may be varied as desired by means of shims 54.

It will be observed that housing 10 is actually shown as two separate members joined together on opposite sides of a block 56 having radial passageways 58 communicating with the return port 14, and at this junction an additional O-ring seal 60 is included to prevent leakage while permitting the members to be pressed together.

With the device in the position shown, the winding 34 is de-energized, and the piston 22 is located in its normal left-hand position under the influence of spring 32, thereby locating pin 28 such that ball valve 44 is held tightly against the seat 40. The spring 52 acts in opposition to spring 32, but is of lesser strength so that spring 32 may hold the ball valve 44 firmly in position against the force of the inlet pressure acting upon the exposed area of the ball valve. When winding 34 is energized, the magnetic force produced thereby, in addition to the force of spring 52, overcomes the force of spring 32 and causes the piston 22, along with guide 24, pin 28 and cylindrical member 30, to move to the right until the air gap shown at numeral 66 is closed. The position taken by these parts when winding 34 is energized is shown in the drawing in dotted outline. This, of course, carries pin 28 away from the ball valve 44 such that, under the influence of the fluid inlet pressure from chamber 12, ball valve 44 now seats on the seat 42 and fluid at inlet pressure is permitted to flow from passageway 12 across seat 40 through the radial passageways 47 of member 46 and out of control passage 16 to the controlled device.

When solenoid winding 34 is de-energized, the force of spring 32 causes piston 22, guide member 24, pin 28, and spring contact member 30 all to move very rapidly toward the left until pin 28 displaces ball valve member 44 sufficiently to seat it firmly upon seat 40. At such time pin 28, ball valve member 44 and spring contact member 30 stop. Piston 22 continues moving toward the left, however, and its momentum is largely dissipated in compressing spring 52. When the ball valve is seated on seat 40, it is apparent that fluid from the controlled device is free to pass through passageway 16, across the radial passageways 47 of member 46, across seat 42, through passageways 58, and out of return passage 14.

It will be appreciated that if all of the mass of the piston 22 and members 24, 28 and 30 were operative in conjunction with the force of spring 32 to cause ball valve 44 to impact against the very small area of seat 40, rapid deterioration of this seat, and possibly the ball valve 44 as well, would result. With the arrangement shown herein, the large mass of piston 22 actually separates from members 24, 28 and 30, and the kinetic energy represented by its mass and velocity is dissipated in compressing spring 52. In this way the valve structure described may include sufficient spring forces such that actuation is quite rapid, and yet the impact forces exerted on the valve seat and the ball valve member are quite limited, and the life of the valve is considerably extended. The particular configuration illustrated was built and operated over three million cycles without an appreciable degradation in performance, which indicates that the useful life of the valve illustrated could be expected to be many times that of a valve in which the kinetic energy of the entire armature structure is transmitted into the valve seat.

I claim:
1. A solenoid pilot valve assembly including a body having an internal chamber, part of which constitutes a cylindrical bore, and an electrical winding;
   An armature including a hollow piston in said bore magnetically coupled with said winding, a guide member of relatively hard material positioned within the interior of said piston, said guide member having a small diameter axial passageway, a pin movable within said axial passageway and a larger diameter member movable within said piston in contact with said pin;
   an inlet passageway in said body at least part of which is in substantial axial alignment with said pin;
   a return passageway in said body;
   a control passageway in said body;
   a first valve seat positioned between said inlet and control passageway;
   a second valve seat positioned between said control and return passageways;
   a support member positioned between said seats having an annular passageway therethrough in substantial alignment with said pin, and having at least one radial slot communicating said annular passageway with said control passageway;
   a ball valve movable in said annular passageway between said valve seats;
   a first spring urging said piston and said pin in such direction as to cause said pin to hold said ball valve against said first seat;
   a second spring urging said piston in a direction opposite to said first spring such that when said winding is energized the resulting magnetic force operates in combination with said second spring and the fluid force in said inlet passage to overcome the force of said first spring to seat ball valve against said second seat and when said winding is de-energized the force of said first spring operates to move said piston and said ball valve member such that said ball valve member is seated against said first seat and a substantial part of the kinetic energy of said piston is expended in compressing said second spring.

2. A valve as set forth in claim 1 wherein said second spring is positioned in a chamber communicating with said return passageway and passage means are provided communicating said chamber with the portion of said cylindrical bore containing said first spring.

References Cited
UNITED STATES PATENTS

| | | | |
|---|---|---|---|
| 2,296,132 | 9/1942 | Wiseley | 251—139 |
| 2,569,751 | 10/1951 | Dube et al. | 137—625.65 XR |
| 2,622,618 | 12/1952 | Ghormley | 251—30 |
| 2,887,125 | 5/1959 | Lucien | 137—625.65 |
| 3,043,336 | 7/1962 | Parent et al. | 137—596.17 XR |
| 3,291,153 | 12/1966 | Chabrier et al. | 137—625.66 XR |
| 3,321,177 | 5/1967 | Fendel et al. | 251—210 |
| 3,324,889 | 6/1967 | Batts | 251—139 XR |

HENRY T. KLINKSIEK, *Primary Examiner.*

U.S. Cl. X.R.

251—129